Figure 1A:
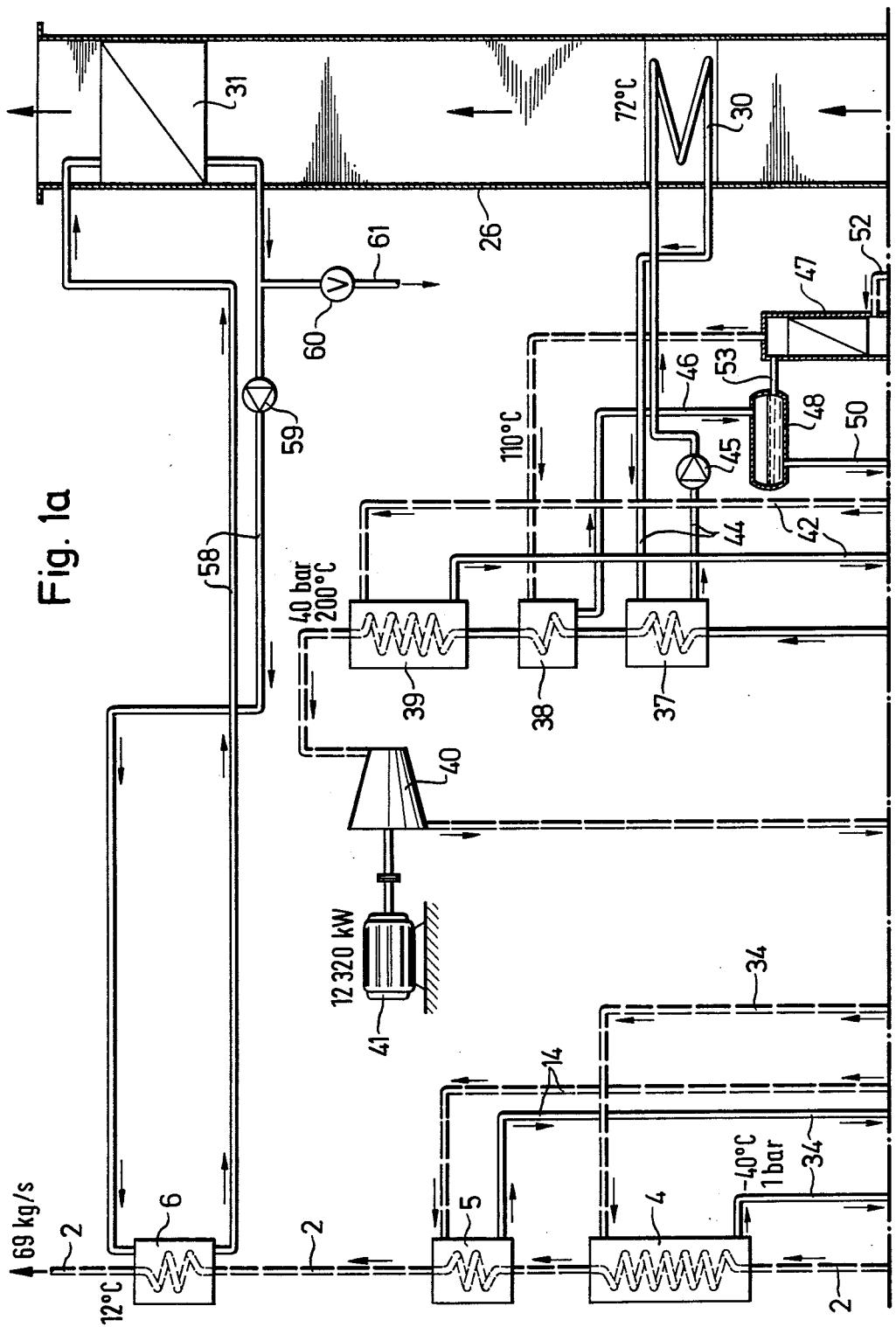

United States Patent [19]

Mandrin

[11] 4,036,028

[45] July 19, 1977

[54] PROCESS AND APPARATUS FOR EVAPORATING AND HEATING LIQUIFIED NATURAL GAS

[75] Inventor: Charles Mandrin, Winterthur, Switzerland

[73] Assignee: Sulzer Brothers Limited, Winterthur, Switzerland

[21] Appl. No.: 627,331

[22] Filed: Oct. 30, 1975

[30] Foreign Application Priority Data

Nov. 22, 1974 Switzerland .................. 15545/74

[51] Int. Cl.² ........................................... F17C 7/02
[52] U.S. Cl. ........................................ 62/52; 60/39.02; 60/39.46 G; 60/655; 62/99
[58] Field of Search .............. 62/52, 53, 86–89, 62/96, 99; 60/655, 671, 39.5, 39.05, 39.18 R, 39.18 B, 39.02, 39.52, 39.53, 39.46 G; 122/7

[56] References Cited

U.S. PATENT DOCUMENTS

| | | | |
|---|---|---|---|
| 2,593,963 | 4/1952 | Biggs | 60/655 |
| 3,068,659 | 12/1962 | Marshall, Jr. | 62/52 |
| 3,183,666 | 5/1965 | Jackson | 60/39.02 X |
| 3,331,214 | 7/1967 | Proctor et al. | 62/52 X |
| 3,438,216 | 4/1969 | Smith | 62/52 |
| 3,535,210 | 10/1970 | Linde et al. | 62/52 X |
| 3,770,048 | 11/1973 | Linhardt et al. | 62/52 X |
| 3,867,811 | 2/1975 | Waeselynck | 62/52 X |

*Primary Examiner*—Ronald C. Capossela
*Attorney, Agent, or Firm*—Kenyon & Kenyon, Reilly, Carr & Chapin

[57] ABSTRACT

The waste heat of an open gas turbine system used to heat a flow of liquified natural gas is recovered and passed via an intermediate heat exchange circuit or system to the flow of liquified natural gas. The intermediate circuit uses hydrocarbons which may or may not have been halogen-substituted as the heat exchange medium. The heat is extracted from the flue by closed piping systems which use water as a heat carrier as well as a system which uses an anti-freeze agent such as methanol. The anti-freeze circuit permits injection of the anti-freeze agent into the intake of the gas turbine while a rectifying column allows recovery of the anti-freeze agent. The intermediate circuit includes a vapor turbine which expands the hydrocarbon medium after the hydrocarbon medium receives heat in order to produce useful work.

7 Claims, 2 Drawing Figures

PROCESS AND APPARATUS FOR EVAPORATING AND HEATING LIQUIFIED NATURAL GAS

This invention relates to a process and apparatus for evaporating and heating liquified natural gas and, particularly, to a process and apparatus for evaporating and heating liquified natural gas using heat obtained from an open gas turbine plant.

Various types of processes and apparati have been known for evaporating and heating liquified natural gas (hereinafter referred to as LNG) by using energy obtained from an air flow supplied to an open gas turbine plant. In some cases, such as described in United Kingdom Patent No. 1,213,725, some of the heat of the gas turbine exhaust gases has been recovered and used to heat the LNG via a direct heat exchange. As also described, the LNG can be heated and evaporated by cooling of the gas turbine intake air.

However, it has been found that these known techniques have had a limited efficiency and a limited specific performance, that is performance referred to the unit weight of fuel supply to the gas turbine and/or to the unit weight of natural gas to be evaporated.

Accordingly, it is an object of the invention to improve the specific performance of the processes and apparati used to heat and evaporate liquified natural gas.

It is another object of the invention to increase the efficiency of the process and apparati used to heat and evaporate liquified natural gas.

It is another object of the invention to provide a process and apparatus for evaporating and heating liquified natural gas which uses a relatively small amount of energy.

Briefly, the invention provides an apparatus and method for evaporating and heating liquified natural gas (LNG) in which waste heat is at least partially recovered and used to heat the LNG and to produce work.

The apparatus comprises a means defining a predetermined flow path for a flow of liquid natural gas and an open gas turbine system having an air intake and an exhaust flue for a flow of hot exhaust gases. The apparatus also includes a first heat exchange system for cooling air taken into the air intake of the turbine system and for heating the flow of LNG as well as a second heat exchange system for extracting heat from the flow of exhaust gases in the flue and for heating the flow of LNG with the extracted heat. This second heat exchange system includes a closed piping system which functions as an intermediate circuit and which has a hydrocarbon heat exchange medium therein, at least one heat exchanger for receiving heat from the exhaust gas flow to heat the hydrocarbon medium and at least one heat exchanger for heating the natural gas in heat exchange relation with the hydrocarbon medium. In addition, the second heat exchange system includes a compressor means in the piping system downstream of the heat exchanger which heats the natural gas and a vapor turbine upstream of this heat exchanger. The compressor means functions to compress the hydrocarbon medium while the vapor turbine serves to expand the hydrocarbon medium to produce work.

The hydrocarbon medium which circulates in the intermediate circuit may or may not be halogen-substituted. In use, the hydrocarbons are liquified as a result of yielding heat to the natural gas, then compressed to elevated pressure, evaporated at least to some extent by heat from the exhaust gases and expanded, with the performance of work in the vapor turbine.

The hydrocarbons used in the intermediate circuit are further characterized in being heat resistant up to at least approximately 200° C, have a critical temperature below 90° C, and remain liquid at the lowest temperature arising in the intermediate circuit. The latter temperature depends upon the temperature of the LNG to be heated. Suitable hydrocarbons are e.g. propane or the refrigerant R 115 ($CF_3 - CF_2Cl$); the high-pressure section of the vapor circuit can be operated in supercritical and in subcritical conditions.

The process of the invention includes the steps of passing a flow of LNG through a predetermined flow path, generating a flow of hot exhaust gases in a flue of an open gas turbine system and passing a flow of hydrocarbon heat exchange medium through a closed piping system for evaporation under heat extracted from the flow of exhaust gases, subsequent expansion with the performance of work, liquefaction under a heat exchange relation with the LNG flow so that heat is delivered to the LNG and compression at an elevated pressure.

This invention, as well as providing the transfer of heat from the exhaust gases to the LNG to evaporate and heat the same, uses the existing considerable temperature difference between the exhaust gases and the LNG as a means of further saving energy. This temperature difference is so greater that no additional external energy, for example in the form of direct heating based on combustion of fuel, and disregarding the energy required to increase pressure, needs to be supplied to the vapor circuit. However, to optimize the complete process, it may sometimes be convenient if the gas turbine exhaust gases are also directly reheated.

According to another feature to improve the process, the hydrocarbon yields some heat after expansion to its liquid phase. Advantageously too, in order to deliver heat to the intermediate circuit, the circuit is associated with the exhaust gas flow of the gas turbine by way of a second closed piping system which uses a heat carrier. Water or its vapor are particularly suitable as this heat carrier. In cases in which propane is used in the intermediate circuit, the feature just described obviates the risk of explosion which would otherwise arise in the event the exhaust gas flue heat exchanger leaks. Also, the heat exchanger experiencing the hot exhaust gases need not be constructed, in the corresponding plant, for the relatively high pressure of the intermediate circuit.

The apparatus of the invention may also have a means for injecting an anti-freeze agent, e.g. methanol or ethanol, into the gas turbine intake air flow which requires cooling. Since the anti-freeze agent forms a solution with most of the water vapor content of the air, a rectifying means is also provided for receiving and vaporizing the anti-freeze agent downstream of the air intake. In this way, the mixed phase can be separated within the rectifying means. The specific performance or efficiency of the total process can be further improved if the anti-freeze agent which has been added to the turbine intake air and whose liquid mixed phase is evaporated for and during rectification by some of the waste heat of the gas turbine is condensed to at least some extent, as a gaseous head product of rectification, by the liquid phase of the vapor turbine circuit.

The second closed piping system may thus have, in addition to the heat exchanger in the first piping system, at least one pumping means for the heat carrier and a heat exchanger in the exhaust gas flue. To adapt the plant to the use of an anti-freeze agent, one heat exchanger of the first piping system communicates, by way of the head product removal line of the rectifying means with a means for admixing the anti-freeze agent in the gas turbine intake line. Also, an additional burner can be provided in the gas turbine exhaust line.

Figure 1B:
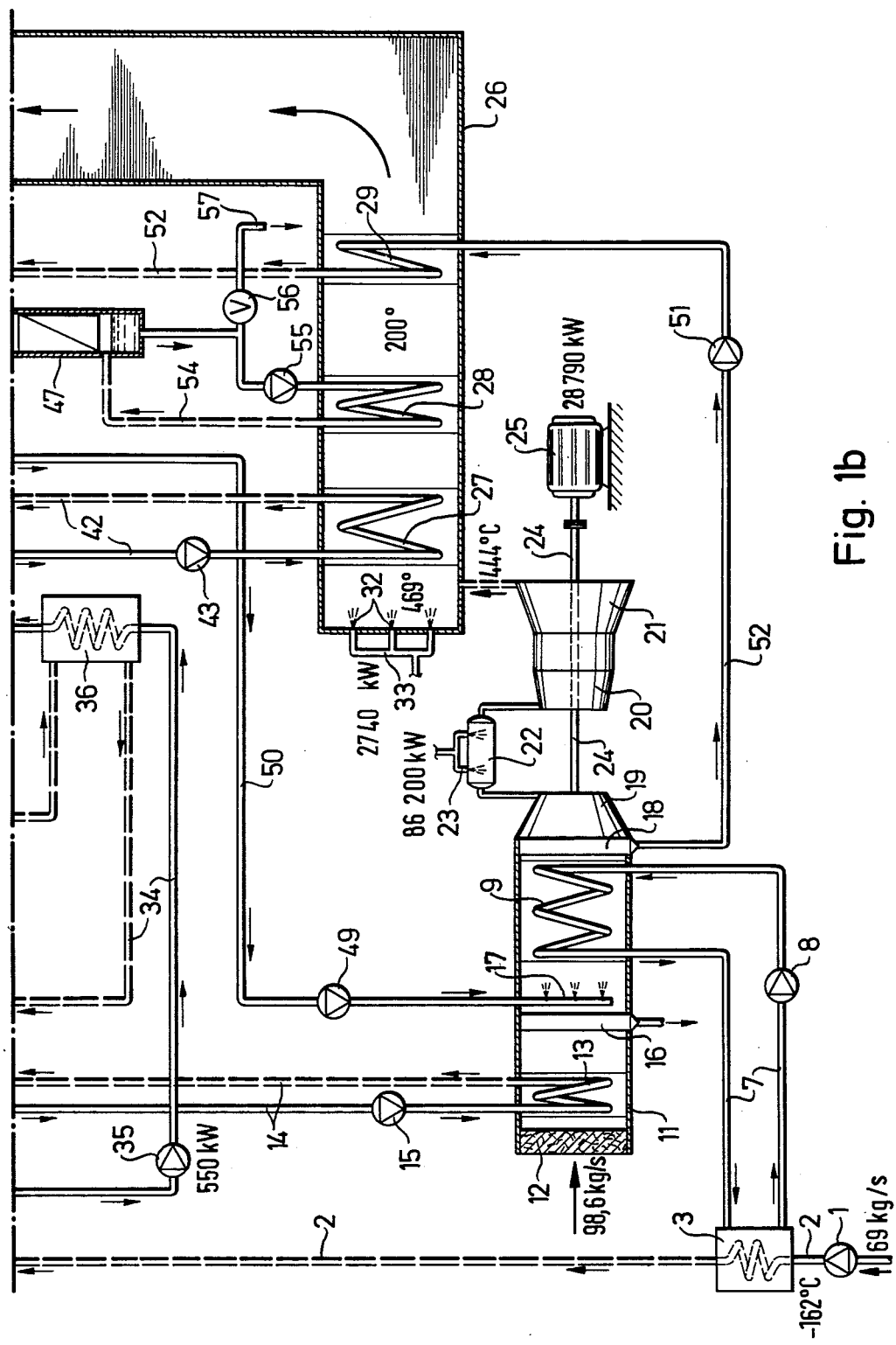

These and other objects and advantages of the invention will become more apparent from the following detailed description and appended claims taken in conjunction with the accompanying drawings in which:

FIGS. 1a and 1b schematically illustrate an apparatus according to the invention.

Referring to FIGS. 1a and 1b, the apparatus or plant includes a means in the form of a pipeline 2 which defines a predetermined flow path for a flow of LNG as well as a pump 1 for pumping the LNG through the pipeline 2 at a pressure, for example at a 1 bar pressure increase to the usual figure of 70 bars used for long-distance gas lines. The plant also includes an open gas turbine system having an air intake 11 and an exhaust flue 26 for a flow of hot exhaust gas.

A first heat exchange system is provided for cooling the air taken into the intake 11 of the turbine system and for heating the flow of LNG. To this end, the heat exchange system includes a heat exchanger 9 in the intake 11, a heat exchanger 3 in the LNG pipeline 2, a line 7 for circulating a heat carrier between the two heat exchangers 3, 9 and a pump 8 in the line 7 for circulating the heat carrier in the line 7. The heat carrier which must have a very low freezing point because of the low temperature of the LNG is the refrigerant R22 ($CHF_2Cl$). This system removes energy from the air in the intake 11 for partial evaporation of the LNG in the exchanger 3.

The heat exchange system also includes a heat exchanger 13 in the forward end of the intake 11 which communicates via a line 14 with a heat exchanger 5 in the LNG pipeline 2. A pump 15 is also provided in the line 14 to pump a heat carrier, such as R 22, therethrough. The heat exchanger 5 functions to heat the evaporated natural gas. As is the case in other systems of lines and pipes, the broken line representing a portion of line 14 indicates that in the broken-line section the flowing medium is present at least to some extent as a vapor, whereas the flowing medium present in the portions of piping shown in solid line is in the liquid phase.

An air filter 12 is also provided in the intake 11 upstream of the heat exchanger 13 in order to filter out impurities from the intake air. Coming after the heat exchanger 13 in the passage 11, as considered in the direction of air flow, are a first water separator 16 and then an injection or trickling device 17; the latter forms part of a section of the plant which will be described in detail hereinafter and which enables an anti-freeze, e.g. methanol, to be introduced into the air flow, the resulting mixed phase of methanol and water being separated from the air flow by a liquid separator 18 and broken down later into methanol and water.

A second heat exchange system is also provided for extracting heat from the flow of exhaust gases in the flue 26 and for heating the flow of natural gas in the pipeline 2 with the extracted heat. This system includes a closed piping system 34 having a hydrocarbon heat exchange medium, such as propane, therein, a heat exchanger 4 for heating the natural gas in the pipeline 2 in heat exchange relation with the hydrocarbon medium, and a series of heat exchangers 36, 37, 38, 39 at least some of which receive heat from the flue gases in the flue 26 to heat the hydrocarbon medium. In addition, a compressor means 35 such as a pump is disposed in the piping system 34 downstream of the heat exchanger 4 in the natural gas pipeline 2 for compressing the hydrocarbon medium and a vapor turbine 40 is disposed in the piping system 34 upstream of the heat exchanger 4 for expanding the hydrocarbon medium to produce work. As shown, the turbine 40 drives a generator 41.

During operation, the heat exchanger 4 in the pipeline 2 receives the energy needed to heat the natural gas from the propane circulating through the system of piping 34 which forms the intermediate circuit. The propane, after liquifaction by the natural gas in the heat exchanger 4, is then pumped at a considerably higher pressure by the pump 35 and is heated, evaporated and superheated in the heat exchangers 36 – 39 and then is expanded, to do work, in the vapor turbine 40 which, in turn, drives the generator 41. The expanded propane then flow through the heat exchanger 36 to yield heat to its liquid phase and then returns to the heat exchanger 4 for liquification to complete the intermediate circuit. The energy required in the heat exchangers 37 – 39 is removed from the turbine exhaust gases in the flue 26.

In order to obtain the energy required in the heat exchangers 37 – 39 from the gases in the flue 26 use is made of a second closed piping system which passes in heat exchange relation with the heat exchangers 37 – 39. This system includes a heat exchanger 27 near the inlet portion of the flue 26 which carries a heat exchange medium such as water via a pipeline 42 to and from the heat exchanger 39. A pump 43 or other circulator is also provided in the pipeline 42 to pump the water through the heat exchangers 27, 39. A similar heat exchanger 30 in an intermediate portion of the flue 26 is connected via a pipeline 44 and pump 45 to the heat exchanger 37 and uses water as a heat carrier.

Further, heat exchangers 28, 29 are also disposed in the flue 26 to extract heat energy for transfer to the heat exchanger 38. These additional heat exchangers 28, 29 cooperate with a rectifying means 47 as well as with the liquid separator 18 in the air intake 11 of the turbine system. To this end, the heat exchanger 29 is connected on one side to the liquid separator 18 via a pipeline 52 through which a mixture of methanol and water is pumped via a pump 51. The opposite side of the heat exchanger 29 is connected via the pipeline 52 to the rectifying means such as a rectifying column 47. The rectifying column 47, in turn, is connected to a pipeline 46 to the heat exchanger 38 to deliver the vaporous head product of the column 47 thereto. The heat exchanger 38 is also connected on the outlet side via the pipeline 46 to a methanol supply tank 48. Another pipeline 53 disposed below the level of liquid in the tank 48 connects the tank 48 to the top zone of the column 47. The supply tank 48 is also connected via a pipeline 50 to the injection device 17 so that methanol can be pumped via a pump 49 in the pipeline 50 into the air flow in the air intake 11.

The heat exchanger 28 is connected via a pipeline 54 to the bottom of the rectifying column 47 to have the bottom product, i.e. separated water, circulated therein via a pump 55 in the pipeline 47. A separate branch line 57 is connected to this pipeline 54 via a valve 56 in order to allow surplus water to be tapped off.

During operation, the pump 49 delivers methanol via the line 50 from the supply tank 48 to the injection device 17 in the gas turbine intake 11. The liquid methanol/water mixture formed in the intake line 11 is then pumped by the pump 51 through the line 52 to the heat exchanger 29 and leaves the same, sometimes already at least partially in vapor form, as a feed flow for the rectifying column 47. The column 47 then dissociates the mixture into gaseous methanol as head product and water as bottom product. The methanol vapor then flows through the line 46 to the heat exchanger 38 and tank 48 while the liquid bottom product of the column 47, the main ingredient of which is water flows through the line 54 to the heat exchanger 28 in order to supply some of the evaporation energy needed for the column 47.

As the methanol flows through the heat exchanger 38, the heat take-up by the propane in the pipeline 34 causes the methanol to condense. At the same time, the propane is vaporized.

A further heat exhanger 6 is disposed in the natural gas pipeline 2 to receive heat energy directly from the exhaust gases in the flue 26. To this end, a heat exchanger 31 is disposed in the flue 26 near the outlet and is connected to the heat exchanger 6 via a pipeline 58 through which water is circulated by a pump 59 in the pipeline 58. Salt may be mixed into this flow of water in order to provide protection against freezing and to provide neutralization. Neutralization of the water is essential since the water in the heat exchanger 31, which is of the trickle film kind, is acidulated by dissolution of exhaust gases. Since the temperature in the heat exchanger 31 falls below the dew point temperature of the water present in the exhaust gases, excess water accumulates in the pipeline 58 and is removed through a drain pipe 61 which has a valve or cock or the like 60.

The gas turbine system comprises a compressor 19 which communicates with the intake 11 and which a shaft 24 connects to turbines 20, 21 shown in two parts. A combustion chamber 22 is connected between the compressor 19 and the turbine 20 which is supplied with fuel through a line 23. The LP turbine section 21 drives a generator 25 as a load by way of the shaft 24. The turbine exhaust gases pass to the exhaust flue or passage 26 in which, before leaving the plant, they yield some of their residual energy to the heat exchangers 27 – 31.

Extra burners 32 which can be supplied with fuel through a line 33 are provided at the upstream end of the flue 26 to provide optional exhaust gas reheat by direct combustion.

The drawings contain a few numerical values, calculated for the projected plant, in respect of some of the parameters determining the efficiency of the plant and process. As can be gathered from the values given, the efficiency of the calculated plant is approximately 33 to 34 percent without the intermediate circuit according to the invention and approximately 45 to 46 percent with the intermediate circuit according to the invention.

What is claimed is:

1. An apparatus for evaporating and heating liquid natural gas comprising
    means defining a predetermined flow path for a flow of liquid natural gas;
    an open gas turbine system having an air intake and an exhaust flue for a flow of hot exhaust gases;
    a first heat exchange system for cooling air taken into said air intake and for heating the flow of liquid natural gas;
    a second heat exchange system for extracting heat from the flow of exhaust gases in said flue and for heating the flow of natural gas with the extracted heat, said second heat exchange system including a first closed piping system having a hydrocarbon heat exchange medium therein, a first heat exchanger for receiving heat from the flow of exhaust gases to heat the hydrocarbon medium, a second heat exchanger for heating of the natural gas in said flow path in heat exchange relation with the hydrocarbon medium, a compressor means downstream of said second heat exchanger in said flow path for compressing the hydrocarbon medium and a vapor turbine upstream of said second heat exchanger in said flow path for expanding the hydrocarbon medium to produce work;
    means for admixing an anti-freeze agent into said gas turbine system air intake; and
    a rectifying means for receiving and vaporizing the anti-freeze agent downstream of said air intake, said rectifying means having a head product removal line connected to a third heat exchanger in said first closed piping system for receiving heat from the flow of exhaust gas.

2. An apparatus as set forth in claim 1 which further comprises a second closed piping system for a heat carrier, said second closed piping system passing in heat exchange relation with said first heat exchanger in said first closed piping system and including a fourth heat exchanger in said flue to transfer heat from the exhaust gases to said heat carrier and a pump for pumping the heat carrier to said fourth heat exchanger in said flue.

3. An apparatus as set forth in claim 1 which further includes a burner in said exhaust flue for supplemental heating of the exhaust gases.

4. A process for evaporating and heating liquid natural gas comprising the steps of
    passing a flow of liquid natural gas through a predetermined flow path;
    generating a flow of hot exhaust gases in a flue of an open gas turbine system;
    passing a flow of hydrocarbon heat exchange medium through a closed piping system for evaporation under heat extracted from the flow of exhaust gases, subsequent expansion with the performance of work, liquifaction under a heat exchange relation with the flow of liquid natural gas in said flow path wherein heat is delivered to the liquid natural gas, and compression at an elevated pressure;
    admixing a water-miscible anti-freeze agent into an air flow delivered to the gas turbine system;
    rectifying a condensed mixed phase of said agent and moisture from the air flow under a portion of the waste heat of said flow of exhaust gases to obtain a gaseous head product; and
    passing the gaseous head product into heat exchange relation with said compressed hydrocarbon medium to condense the head product.

5. A process as set forth in claim 4 which further comprises the step of extracting heat from the expanded hydrocarbon medium prior to liquidication for delivery to the compressed hydrocarbon medium.

6. A process as set forth in claim 4 which further comprises the step of passing a heat carrier through the flue of the open gas turbine system in heat exchange relation to extract heat therefrom for delivery to the hydrocarbon heat exchange medium in the closed piping system for said evaporation thereof.

7. A process as set forth in claim 4 which further comprises the step of reheating the exhaust gases.

* * * * *